Feb. 6, 1968   E. P. WHITLOW ET AL   3,367,310
ABSORPTION REFRIGERATION GENERATOR
Filed June 9, 1966   2 Sheets-Sheet 1

INVENTORS
Eugene P. Whitlow
John H. Hyma

BY Hofgren, Wegner, Allen, Stellman & LoCord

ATTORNEYS

3,367,310
ABSORPTION REFRIGERATION GENERATOR
Eugene P. Whitlow, St. Joseph, and John H. Hyma, Benton Harbor, Mich., assignors to Whirlpool Corporation, a corporation of Delaware
Filed June 9, 1966, Ser. No. 556,426
6 Claims. (Cl. 122—367)

This invention relates to an absorption refrigeration generator.

It is customary to heat the generator of an absorption refrigeration system by burning a fuel, and particularly a gaseous fuel, in heat transfer relation with the generator in order to drive off dissolved refrigerant from an absorption liquid in the generator and containing this refrigerant in order that the resulting gaseous refrigerant can be condensed and then evaporated to produce the desired refrigeration.

In many installations it is advantageous to provide a small and compact generator and burner system. Ordinarily, if the generator is made too compact, the efficiency and capacity of the refrigeration system suffers.

One of the features of this invention is to provide an improved absorption refrigeration generator including a combustion zone with spaced heat transfer fins therein in which the combustion of the fuel is substantially complete as measured by a low carbon monoxide content of the flue gases at the exit from the generator and with the combustion zone having a minimum size to achieve these results.

Other features and advantages of the invention will be apparent from the following description of one embodiment taken in conjunction with the accompanying drawings. Of the drawings.

Figure 1:
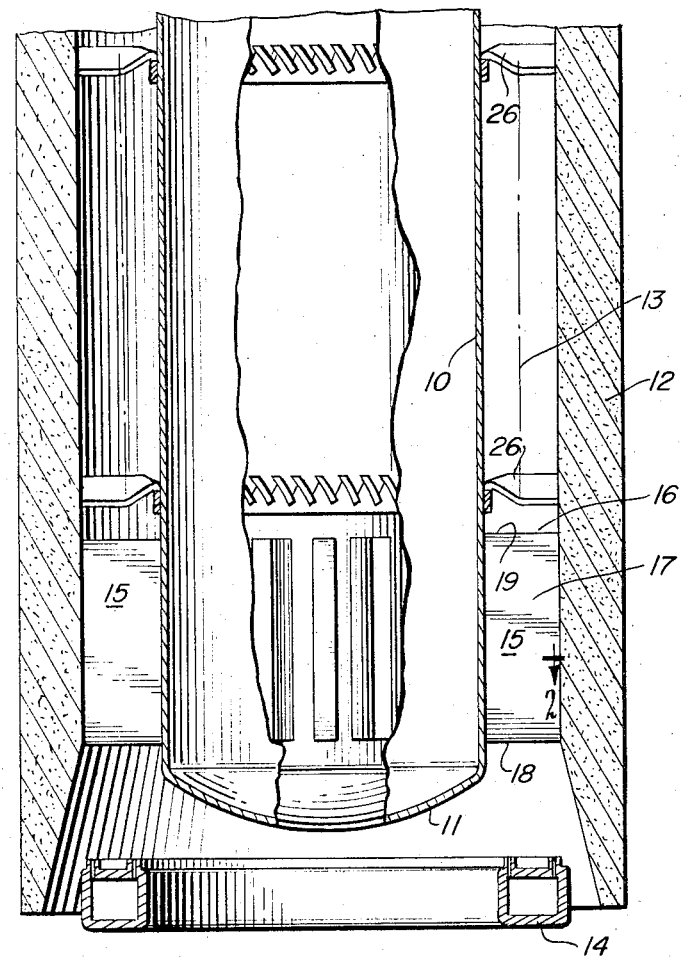
FIGURE 1 is a fragmentary side elevational view partially in section of the lower end of an absorption refrigeration generator including a bottom annular gaseous fuel burner. The internal details of the generator have been omitted from the drawings as they form no part of the invention.

In the generator of this invention there is provided a substantially vertical cylindrical metal shell 10 having a rounded bottom 11. Surrounding the shell 10 and spaced therefrom is a cylindrical insulating sleeve 12. The space 13 between the cylindrical wall of the shell 10 and the sleeve 12 defines the annular passage for the upward flow of the flue gases from a bottom annular burner 14 located beneath the bottom of this annular space 13.

The burner 14 is of the customary type supplied with gaseous fuel and primary air from a conventional source not shown. For most efficient combustion the air supply, both primary and external secondary, is controlled so that the combustion in a bottom combustion zone is substantially complete as indicated by a low carbon monoxide content of the flue gases at the exit of the combustion zone.

Figure 2:
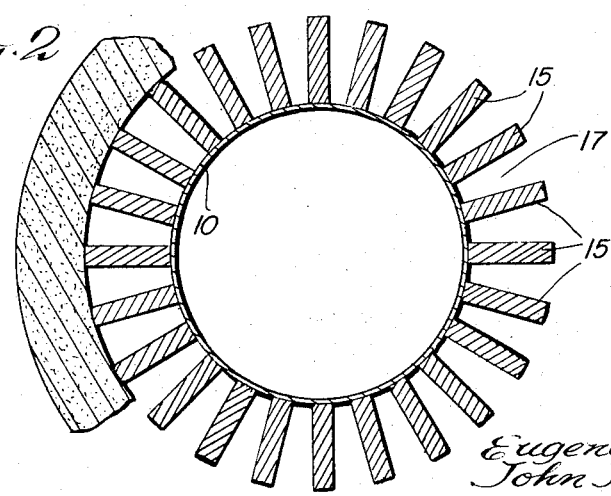
FIGURE 2 is a fragmentary horizontal sectional view taken substantially along line 2—2 of FIGURE 1.
Figure 3:
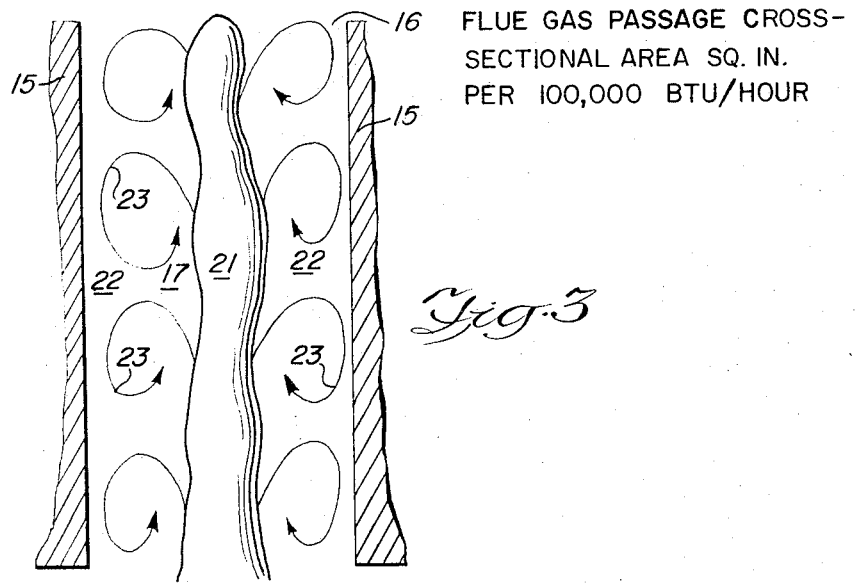
FIGURE 3 is a diagrammatic representation of the combustion zone or flue gas passage between adjacent vertical fins.

In order to attain efficient heat transfer from the flue gases in the space 13 to the shell 10 and thus the absorption liquid therein (not shown) containing dissolved refrigerant, relatively thick fins 15 are provided and spaced radially, extending from above the burner 14 to approximately the top of the combustion zone. Thus, as shown in FIGURE 1, the top of the combustion zone is indicated approximately at 16 as it is at this point that the carbon monoxide content of the rising flue gases is quite low, such as 0.02% by volume or less. As can be seen in FIGURES 1 and 2, the spaced vertical bar or slug fins 15 extend across the combustion zone 17 so that flame and resulting flue gases from the annular burner 14 pass upwardly between the adjacent fins as indicated in FIGURE 3. The bar fins 15 have lengths so that their lower ends 18 are above the annular burner 14 and their upper ends 19 are located substantially at the exit 16 from the combustion zone as measured by the very low carbon monoxide content in the combustion gases.

The bar fins 15 provide adequate fin surfaces for heat transfer contacting the flue gases in the combustion zone. These fins are made relatively thick, as shown in FIGURE 2, in order that the ratio of fin surface to cross sectional area of the fin is small enough to transfer heat efficiently into the generator through the shell 10 so that the fin temperature does not exceed the maximum temperature of 930° F. plus the ambient temperature permitted by public utility regulatory agencies such as the American Gas Association. Of course, excess temperatures in the fins will result in fin scaling and short life.

This constructing of the bar fins 15 of heavy stock tends to limit the amount of heat transfer surface available. In order to solve this problem an obvious thing to do would be to place the heavy fins as close together as possible. However, it has been determined that if they are too close combustion is poor so that much fuel value is lost.

It has been discovered that there is thus a definite relationship between the spacing between the fins 15 which can be expressed as cross sectional area of the combustion zone 17 not including the fins 15 and the burning characteristics within the combustion zone as expressed as percentage of carbon dioxide in the flue gases exiting from the combustion zone at 16. This relationship was discovered by testing many designs of combustion zone and vertical far fin combinations with the spacing between adjacent fins being varied. These data were found to be correlated when the total cross sectional combustion zone area not including the fins 15 was plotted against the carbon dioxide content of the flue gases at the exit of the combustion zone when the air supply was adjusted to give substantially complete combustion as indicated by a very low carbon monoxide content at this exit.

Figure 4:
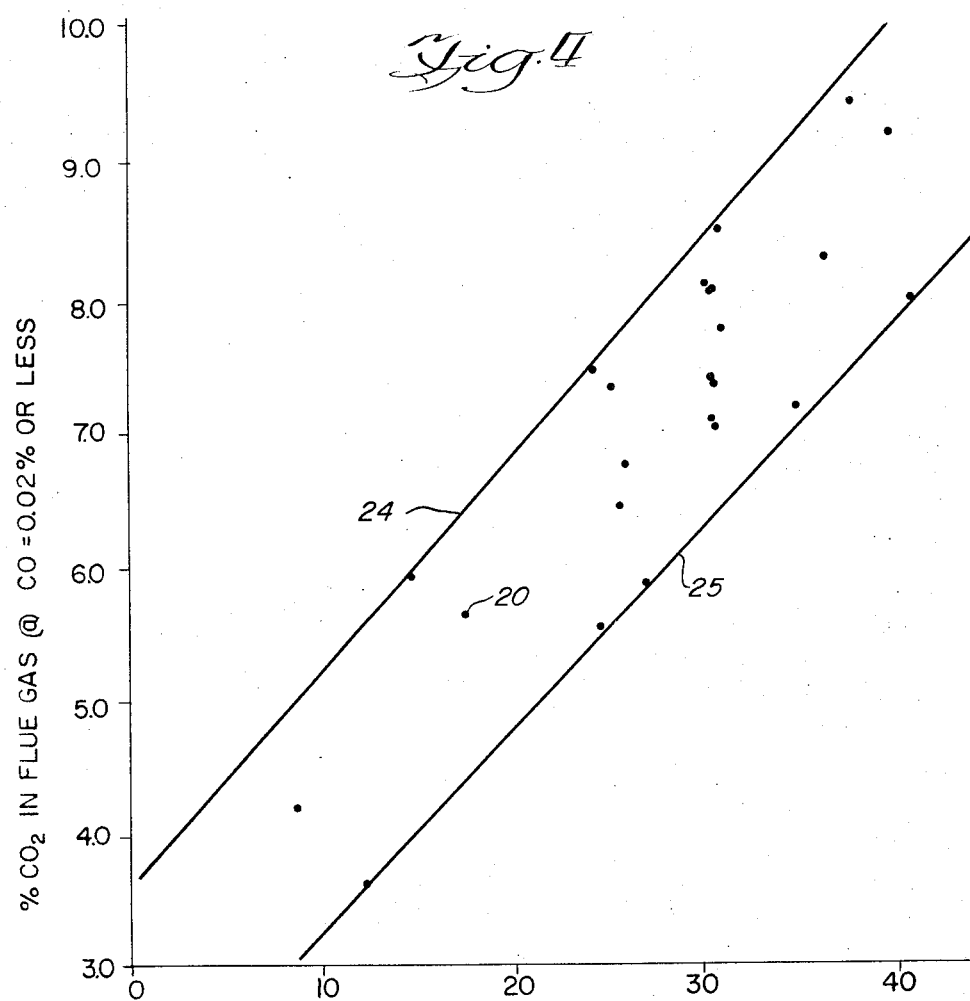
FIGURE 4 is a graph showing the relationship of the total area of the flue gas portion of the combustion zone and the percent carbon dioxide in the flue gas at the exit from the combustion chamber when the air supply is regulated so as to provide substantially complete combustion as indicated by a carbon monoxide content of the gases at the exit of the combustion chamber of about 0.02% or less.

A plot or graph of this data, developed for a combustion system for B.t.u. per hour, is illustrated in FIGURE 4 for burning a fuel gas with the air supply being adjusted to give a carbon monoxide content of 0.02% or less at the exit 16 of the combustion zone 17. As is shown in FIGURE 4, the abscissa of the graph is the cross sectional area of the annular combustion zone 17 available for upward flow of flame and flue gases while the ordinate is the percent carbon dioxide in the flue gas at the exit of the combustion zone when the air supply is such that combustion is substantially complete as indicated by the low carbon monoxide content. The individual data are recorded on the graph of FIGURE 4 as indicated at 20 and as can be noted this data fell within a relatively narrow band.

In observing operation of a generator having a combustion zone with the characteristics described above, it was noted that in each section of the combustion zone 17 between adjacent bar fins 15, as indicated in FIGURE 3, there was projected from the burner 14 a substantially centrally located blue flame 21 of very high velocity. Between this blue flame 21 and the adjacent fin 15 there was a volume of dark flue gases, as indicated at 22, so that the blue flame 21 did not touch adjacent surfaces of the fins 15. It was also noted that although the velocity of the central blue flame 21 was quite high the over-all gas velocity in the dark areas 22 was much less than in the blue flame areas 21 in order to achieve this reduced over-all gas velocity.

From this it was concluded that the gases in the dark heat transfer areas 22 did not go straight up but were in eddy currents as indicated by the curved arrows 23. The result was that heat was transferred to the fins 15 from the high temperature flame 21 by these miniature recirculation or eddy current systems 23. Thus the gases were cooled gradually allowing the carbon monoxide which exists in the hottest portion of the flame to be oxidized to carbon dioxide before the temperature was reduced to a point below which no further oxidation could take place. (It is commonly known that the equilibrium between carbon monoxide, carbon dioxide and oxygen as expressed by the equation $$CO + \tfrac{1}{2} O_2 \rightleftharpoons CO_2$$

is displaced toward the left at high temperatures and toward the right at lower temperatures, and that sudden cooling of the hot gas mixture will result in a relatively high carbon monoxide content because the reaction is relatively slow; time must be provided for the equilibrium shift to take place.) It was at the exit 16 also that the flue gases had been cooled sufficiently that no further oxidation of carbon monoxide to carbon dioxide would take place even if substantial quantities of carbon monoxide had been present.

From the above discussion it can be seen therefore that the data observed and recorded on the graph of FIGURE 4 provides an efficient way of designing a generator with a combustion zone for maximum heating in minimum space. It has thus been discovered that it is necessary to provide a combustion zone with a flue gas passage falling within the area limits as defined by a relatively narrow band bounded by the lines 24 and 25 of FIGURE 4. Such a design will ensure the necessary space for the existence of the miniature recirculation patterns shown in FIGURE 3.

A mathematical analysis of the values of the graph of FIGURE 4 shows that there is a relationship between the percentage of carbon dioxide in the flue gas at the exit 16 of the combustion zone 17 when the air supply is such that substantially complete combustion is achieved, as indicated by a very low carbon monoxide content such as the 0.02% or less of the specific example of FIGURE 4 and the cross sectional area of the combustion space. This ratio can be expressed as percent $CO_2 = 0.16A + K$ where A equals the cross sectional area of the combustion zone 17 in square inches, the carbon dioxide percentage is by volume of the exiting flue gases and K is a number selected between 2½ and 3½ inclusive with the preferred value for K being about 3. This equation of course gives a ready way for calculating the value of A because the equation then becomes $$A = \frac{\text{Percent } CO_2 - K}{0.16}$$

The length of the combustion zone is of course determined by that point in the annular space 13, as indicated at 16, at which the temperature has been reduced to the point where the carbon monoxide content is extremely low such as the illustrative 0.02% by volume or less.

In one embodiment of the invention the flame temperature at the blue flame portion 21 was about 2400° F. The temperature on the heated surfaces of the fins themselves did not rise above the maximum temperature permissible in such structures equal to 930° F. plus the ambient temperature. By the time the gases in the combustion zone had reached the exit thereof they had dropped in temperature to about 1200–1500° F. Thus, with a combustion zone and fin structure designed according to this invention the temperature of the flue gases passing up within the combustion zone dropped at a rate showing that heat was being efficiently transferred into the generator for optimum efficiency and with very low production of carbon monoxide in the exiting gases.

Although in the illustrated embodiment bar fins are illustrated in the combustion zone the invention is not limited to bar fins as long as the fins that are used in the combustion zone are such that the flue gas passage area falls within the range defined by the equation $$A = \frac{\text{Percent } CO_2 - K}{0.16}$$

as described above.

Auxiliary fins indicated by the relatively closely spaced horizontally extending ring fins 26 may be used in the space 13 above the combustion zone 17 for extracting residual heat from the rising flue gases.

Generators of the type disclosed and claimed herein are illustrated in conjunction with other portions of an absorption refrigeration system in the copending applications of John Roeder Jr., Serial No. 498,235, filed October 20, 1965, and Benjamin A. Phillips, Serial No. 502,186, filed October 22, 1965, now Patent No. 3,323,-323, both assigned to the same assignee as the present application.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows.

We claim:

1. A fuel fired absorption refrigeration generator having a combustion zone of substantially minimum volume for efficient and substantially complete combustion of said fuel as indicated by a low carbon monoxide content of flue gases exiting from said zone, comprising: a shell having an outer surface portion; means defining a combustion zone at said outer surface portion having an entrance and an exit; a gas burner adjacent said zone entrance arranged to direct its flame and flue gases therefrom into and through said zone toward said exit; and spaced fins on said shell portion extending across said zone so that said flame and flue gases are positioned between said fins, the total cross sectional area of said combustion zone between said fins being determined by the formula $$A = \frac{CO_2 \text{ Percent} - K}{0.16}$$

in which A equals said area in square inches, the $CO_2$ percent is by volume in said flue gases at substantially said combustion zone exit under conditions of substantially complete combustion in said zone, and K is a selected number in the range 2½–3½ inclusive.

2. The generator of claim 1 wherein said number is about 3.

3. The generator of claim 1 wherein said shell is generally vertical and said combustion zone portion is located adjacent the lower end of said shell.

4. The generator of claim 3 wherein spaced auxiliary fins are provided on said shell above said combustion zone to receive flue gases from said exit and extract residual heat from said exiting gases.

5. The generator of claim 1 wherein said fins are spaced, substantially parallel bar fins whose tops are at substantially the exit from said zone and whose widths extend substantially across said zone.

6. The generator of claim 5 wherein said shell is generally vertical and said combustion zone portion is located adjacent the lower end of said shell and spaced auxiliary fins are provided on said shell above said combustion zone to receive flue gases from said exit and extract residual heat from said exiting gases, said auxiliary fins being spaced closer to each other than are said bar fins to each other.

References Cited
UNITED STATES PATENTS

| | | | |
|---|---|---|---|
| 3,153,439 | 10/1964 | Golden | 62—52 X |
| 3,171,389 | 3/1965 | Throckmorton et al. | 62—52 X |
| 3,269,367 | 8/1966 | Kroehle | 122—367 X |

FOREIGN PATENTS 670,444  9/1963  Canada.

CHARLES J. MYHRE, *Primary Examiner.*